United States Patent [19]

Yasuda et al.

[11] Patent Number: 4,643,703
[45] Date of Patent: Feb. 17, 1987

[54] FRICTIONAL TRANSMISSION CHAIN

[75] Inventors: Tadao Yasuda, Tokorozawa; Toru Kamio, Suita; Yoshiaki Sugimoto, Tokorozawa, all of Japan

[73] Assignee: Tsubakimoto Chain Co., Japan

[21] Appl. No.: 745,666

[22] Filed: Jun. 17, 1985

[30] Foreign Application Priority Data

Jun. 22, 1984 [JP] Japan .................................. 59-127284
Jun. 22, 1984 [JP] Japan .................................. 59-127285

[51] Int. Cl.$^4$ ........................... F16G 1/24; F16G 5/18
[52] U.S. Cl. ..................................... 474/242; 474/201
[58] Field of Search ........ 474/201, 240, 242, 244-247, 474/255, 265, 272

[56] References Cited

U.S. PATENT DOCUMENTS 4,427,401  1/1984  Hendriks et al. .............. 474/242 X
4,525,160  6/1985  Okawa et al. .................. 474/242
4,545,779 10/1985  Sakakibara et al. ............ 474/242 X

FOREIGN PATENT DOCUMENTS 0121350  4/1948  Sweden ........................... 474/242

Primary Examiner—Stephen J. Novosad
Assistant Examiner—Thuy M. Bui
Attorney, Agent, or Firm—Steele, Gould & Fried

[57] ABSTRACT

Link plates are connected into a chain by means of forward and backward connecting pins in each chained link plate. Frictional blocks having slanting outer surfaces are mounted around the link plates and affixed thereto by the connecting pins projecting from the link plates into the frictional blocks. The blocks may have holding pins inserted above and below the connecting pins, whereby opposite parts of the frictional block are attached to one another, enclosing the projecting ends of the connecting pins. The opposite parts of the frictional blocks attached by the holding pins have slanting V-shaped outward-facing frictional transmittance faces, transverse to the chain run for riding in the circumferential V-groove of a pulley. The blocks also have slanting faces longitudinally along the chain run on the side of the chain to be oriented toward a pulley, and straight abutting faces on the side of the chain to be oriented away from the pulley. The frictional block pieces engage the connecting pin ends and have through holes for insertion of the holding pins.

10 Claims, 5 Drawing Figures

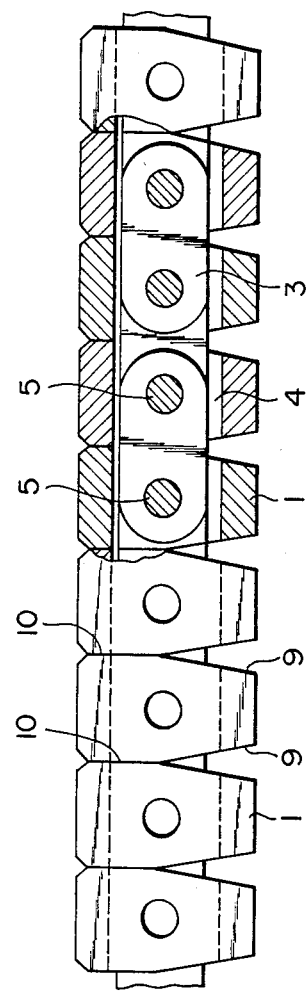
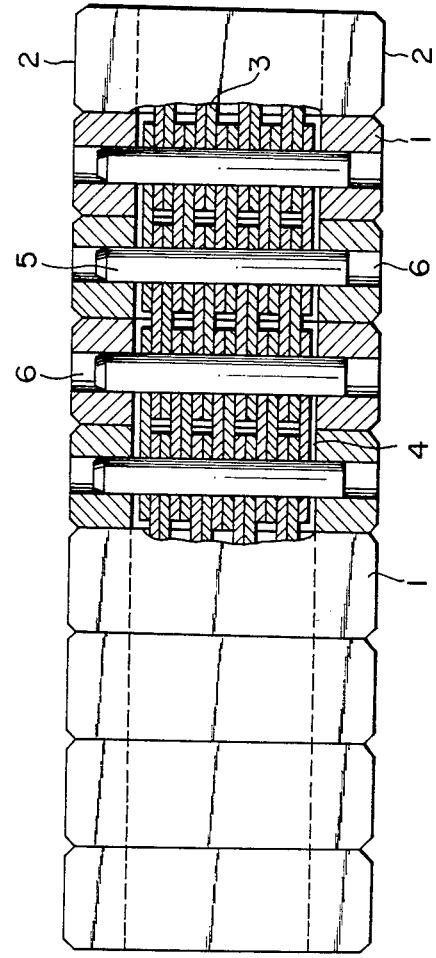

FRICTIONAL TRANSMISSION CHAIN

BACKGROUND OF THE INVENTION

This invention relates to a frictional power transmission chain for a pulley-type power transmission device, and in particular to such a chain for a stepless transmission or the like.

It is well known in the art that a rubber V-belt can be used as a power transmission element between shafts having pulleys and that a V-belt can be used in a stepless transmission having a split pulley with movable slanting faces. A metallic V-belt having a steel band in a rubber V-block has also been developed in recent years (See Japanese Laid-Open Appln. No. 54-52253).

It is also known that certain disadvantages of the steel band used in this metallic V-belt can be eliminated as disclosed in Japanese Laid-Open Appln. No. 59-17043. In the device disclosed in Appln. No. 59-17043, a link chain is utilized in place of a steel band. Fatigue of a steel band results from tension along the outer side of bends in the band and corresponding compression on the inner side of bands in the band when the band is bent in passing around the driving and driven pulleys. By using chain link, bending stress on a belt is eliminated. However, in the aforesaid Appln. No. 54-52253, the connected links and the V-block in which the link chain is carried still permit sliding relative to one other. In this respect the chain links and the former steel band are similarly stressed and achieve similar results.

Both the steel band and chain link known devices have a common constitution in that the underlying steel bands or chains are assembled with the resilient V-block in a way that enables relative sliding between the V-block and the chain or band due to compression and tension applied to the band in bending around pulleys.

In such a case of sliding movement occurring between parts of an outer V-block and an inner steel band or link chain when the belt is bent when passing around the pulleys, the V-block and steel band or link chain will wear due to this repeating movement occurring on every circuit of the belt. As a result, the durability of the metallic V-belt is inordinately decreased.

Structures of this type are based on a technical concept in which substantial power is transmitted through thrust forces between the individual incremental sections of the belt. The steel band and the link chain are not needed for direct transmission of this power and instead function to keep the successive V-blocks in an endless band form where, upon rounding the pulley, successive belt sections will effectively push the next-leading sections forward from the pulleys as the belt straightens. As a result of the endless band form, relative movement between V-block and steel band or link chain is necessarily produced. Sliding occurs in these devices when the band is forced repeatedly and momentarily to bend into a radius around each pulley.

Furthermore, the steel band or the link chain of the prior art is so much less resilient than the V-block that under tension and compression forces, that a balanced condition as needed in view of the pressing force of the V-groove of the V-pulley is defined by the steel band or chain. The material of the V-block is resiliently forced to comply, so that the varying tension force directly causes fatigue, wear and eventual loss of the band and the chain.

SUMMARY OF THE INVENTION

The present invention eliminates the attribute of previous structures that power is transmitted through a relative thrust force between abutting V-blocks in a chain of successive V-blocks. Instead, the invention relies upon the more basic technical fact that a link chain can function as a tensile transmission means. Furthermore, all the tensile transmission performed through the chain is conducted with a fully-engaged structure in which attachments are provided between each V-block and the link of chain in the immediate area, whereby the frictional transmission is performed and relative slippage problems of the above-mentioned prior art are avoided.

It is an object of the present invention to provide a system in which V-blocks of a frictional transmission chain of V-blocks connected by chain link plates have holes through which both projecting ends of the connecting pins for the successive chain link plates are inserted. A space for the chain link plates is formed at the central part of the blocks, and both outside slanting faces of the V-blocks act as slanting frictional transmission surfaces. The blocks as well as the link plates are carried on the connecting pins.

It is another object of the present invention to provide a frictional transmission chain in which the frictional transmission V-blocks have holes into which both opposite projecting ends of the chain link plate connecting pins are inserted and the V-blocks also have through holes through which each of the ends of additional holding pins are passed above and below the aforesaid holes for the ends of the connecting pins. The outside surfaces of the V-blocks are formed as slanting frictional transmission surfaces which are affixed by the holding pins of which both ends are fixed in said through-holes above and below the connecting pins.

The present invention concerns a stepless transmission of the type in which the opposed surfaces of a driving or driven pulley are formed as separate halves of a V-shaped pulley carried on the same axis and there are arranged to be movable apart and together, thereby expanding and contracting the clearance between the opposed slanting surfaces. Inasmuch as the facing halves define a V-shaped circumferential groove, their axial spacing defines the effective radius of the pulley for a belt of given width. When the frictional transmission chain of the present invention is wound around and between a pair of the above-mentioned and controllably spaced-apart pulleys in an endless manner, both outside surfaces of the frictional transmission V-blocks of the belt are held and pressed by the opposed surfaces of the above-mentioned pulleys, and the chain is tensioned and driven through the connecting pins of the chain under the frictional transmission between the pulleys and the above-mentioned V-blocks, without undue wear.

BRIEF DESCRIPTION OF THE DRAWINGS

The accompanying drawings are intended to be representative rather than limiting, and illustrate the preferred embodiments of the present invention, wherein FIGS. 1 to 3 show a first preferred embodiment of the present invention, and FIG. 1 is a front elevational view showing a length of chain according to the invention with a part shown in section.

FIG. 2 is a top plan view thereof.

FIG. 3 is an enlarged side elevation view, in section, showing a frictional transmission V-block.

FIG. 4 is a front elevational view showing a length of chain with a part shown in section.

FIG. 5 is an enlarged transmission V-block piece which is installed in a chain.

DETAILED DESCRIPTION OF THE PREFERRED EMBODIMENTS

Figure 3:
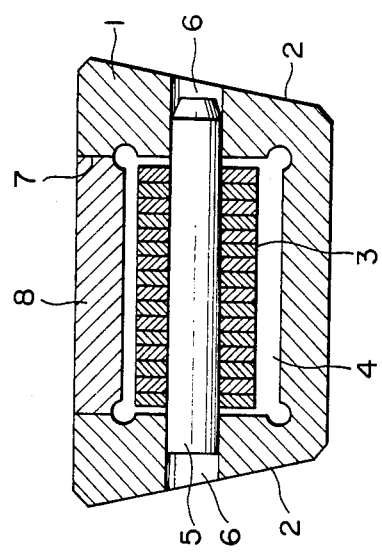

FIG. 1 is a front elevation view showing a length of frictional transmission chain according to the first preferred embodiment of the invention, partly in section. FIG. 2 is a top plan view of a length of the frictional transmission chain of the invention, also partly in section. FIG. 3 is a side elevation view in section, showing a frictional transmission V-block for use in the present invention, wherein the frictional transmission V-block 1 is formed with V-shaped frictional transmission slanting surfaces 2, 2 at both its outside surfaces. As also shown in FIG. 3, a space 4 is provided at the central part of the block, for receiving link chain 3. Extending transversely of the chain run through-holes 6 are arranged for receiving protruding ends of the connecting pins 5 that pivotally affix successive chain link plates. The holes 6 for pins 5 run clear through the above-mentioned space 4 and through both outside surfaces 2, of V-block 1.

The upper surface of the frictional transmission V-block 1 may be provided with an assembly port 7 for use in feeding the link plates into the V block from above as required, after which the lid member 8 may be fitted and sealed to the feeding port 7. The V-blocks may be made of rubber or plastic; the chain may be a steel roller chain or the like.

One or both ends of the connecting pins 5 may be formed as annular shapes which may be inserted into the insertion holes 6 of the V-block and thereafter flanged outwards or otherwise expanded to hold pins 5 in place in holes 6. For this purpose a wedge type peening tool may be applied to cause the annular shapes to become enlarged and thereby to engage the inner circumferential surfaces of the insertion holes 6.

A bushing (see FIG. 4) may be press fit between the connecting pins 5 and the link plates to make the chain roll smoothly. The longitudinally forward and rearward surfaces of the frictional transmission V-blocks may also be formed as slanting surfaces 9, 9 (see FIG. 1). Due to the slanting contour, V-blocks 1 have their portions on one side of the chain spaced from one another so as not to cause the forward and rearward adjoining V-blocks to be compressed or otherwise interfered with by contact with one another when the chain is bent in winding around the pulleys. The portion of V-blocks 1 on the other side of the chain may include upright surfaces 10, 10 which are abutted against each other in order to prevent the chain from being bent backwards, i.e., upwards in FIG. 1. The upright surfaces 10 therefore help support the chain and prevent any downward descending action at the tensioned side of the belt or any over-wrapping after links pass the drive pulley. Upright portions 10, 10 further prevent fluttering of the chain. V-blocks as so formed make it feasible that the V-shaped frictional transmission slant faces 2, 2 can be driven on pulleys and the like having a high coefficient of friction for increasing the frictional force without adverse effects.

The frictional transmission V-blocks 1, when wound around the V-groove of the pulley, transmit the rotational driving force of the pulley directly to the connecting pins installed in the above-mentioned block, and thereby transmit a tension or traction force through the link plates 3 and connecting pins 5 to the entire chain. This transmits the pulley's driving force using the tensile force of the chain, with the result that the frictional transmission V-block 1 acts as a means for transmitting the driving force of the pulley via the connecting pins and does not transmit the driving force by way of any relative pushing or thrusting force from link to link along the V-belt.

Figure 4:
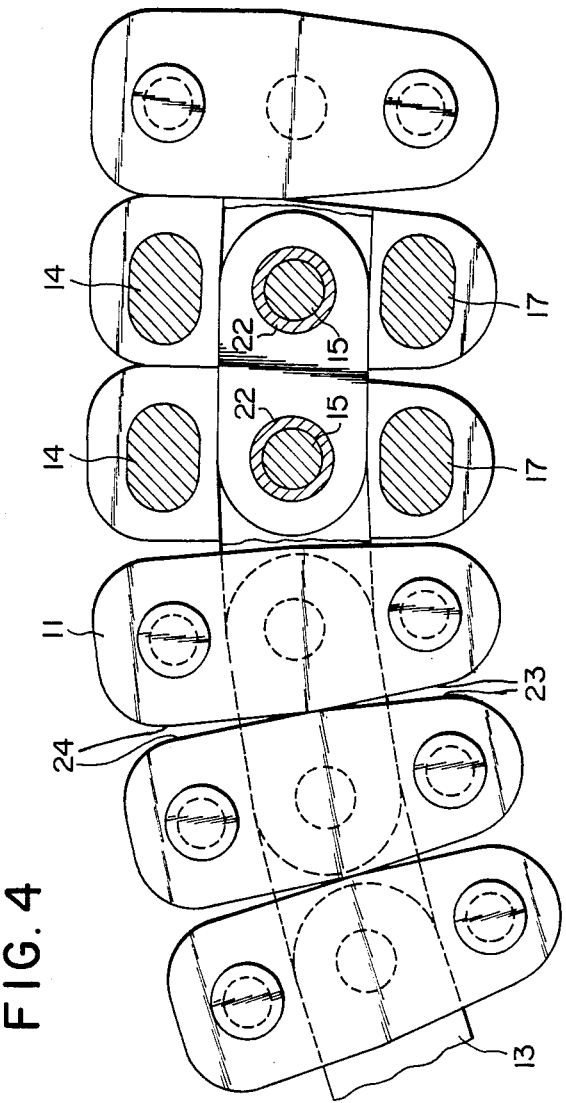
FIGS. 4 and 5 show a second preferred embodiment of the present invention.
Figure 5:
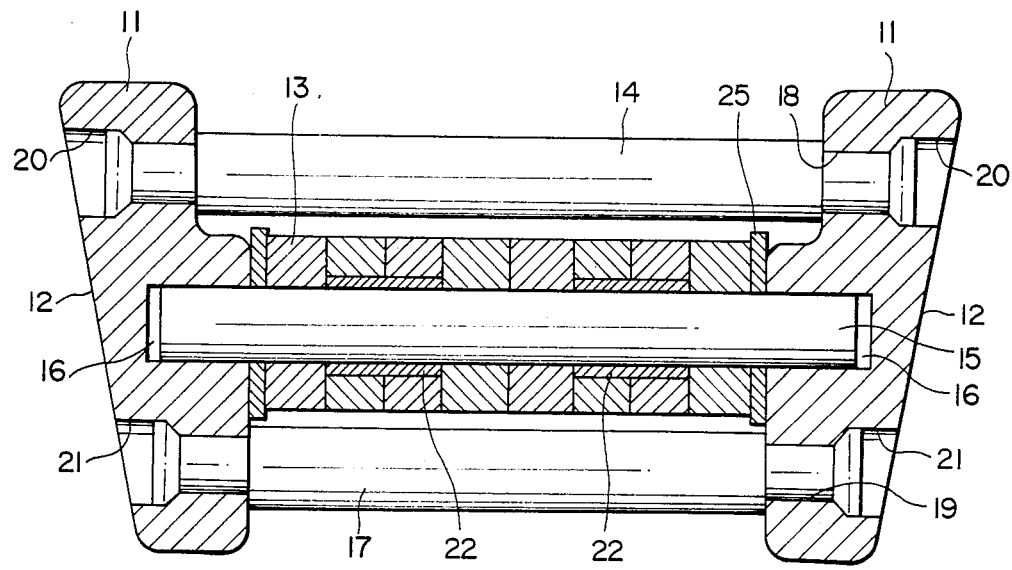

FIG. 4 is a front elevation view, partly in section, showing a length of frictional transmission chain according to the second preferred embodiment of the present invention. FIG. 5 is a side elevation view in section, showing the frictional tranmission V-block of the second preferred embodiment formed in a chain, wherein the frictional transmission V-block pieces 11, 11 are formed with frictional transmission slanting surfaces 12, 12 at their outer surfaces as shown in FIG. 5, for cooperating with a pulley. At the same time, pieces 11, 11 have means for connection to one another and for receiving the connecting pins. Pieces 11, 11 define inward-facing holes 16 for receiving protruding ends of the connecting pin 15 for the chain 13. Through holes 18 and 19, in which each of the ends of the holding pins 14 and 17 are held and fixed, are disposed above and below the inward holes 16 that carry the chain link connecting pins. The outside surfaces of pieces 11, 11 at the through-holes 18 and 19 are formed with spot facing or counterbored holes 20 and 21 so as to prevent the ends of the holding pins 14 and 17 from projecting out beyond the slanting outside surfaces of the frictional transmission block pieces 11, 11.

Both ends of the holding pins 14 and 17 are press fit in the counterbored holes 20, 21. The ends of the holding pins 14 and 17 may be formed in an annular shape and after they are inserted into through-holes 18 and 19 of the V-block, the annular portions may be expanded with a wedge-shaped knock pin, peen or the like and engaged against the inner circumferential surfaces of the insertion and through-holes 18 and 19 to prevent withdrawal. The portions of the holding pins 14 and 17 abutting the inner surfaces of the V-block pieces are formed with shoulders so as to bear holding and pressing forces applied to the V-block pieces 11, 11 by the V-groove of the pulley.

Similar to the embodiment of FIGS. 1-3, a bushing 22 may be forcibly fitted to the device between the connecting pins 15 and the link plates to make the chain roll smoothly. The forward and backward surfaces of the frictional transmission V-blocks 11, 11 may have their protions to be directed radially inwards on the pulleys, provided with spaced-apart slant surfaces 23, 23 so as to prevent the forward and backward adjoining V-blocks from being compressed against one another or otherwise caused to interfere when the V-blocks are wound around the pulleys. The upper half parts can be formed with upright surfaces 24, 24 abutted against each other to thereby support the chain and prevent deformation of the chain path at either the tensioned side, leading to the drive pulley, or the following side after the drive pulley. The structure further prevents fluttering of the chain. The V-shaped frictional transmission slant surfaces 12, 12 may be provided with a member having a high frictional coefficient for increasing the friction force, without adverse affect.

A vibration-resisting damper 25 may be installed between the abutting inner surface of the frictional transmission V-blocks 11, 11 and outer surface of the chain link plates. This further reduces noise and vibration.

According to both embodiments of the invention discussed herein, the frictional transmission V-blocks 11 (or 1) wind around the V-grooves of the pulleys under tension, where they are held and pressed transversely inwardly. The connected V-block and link structure transmits the rotational driving force of the pulleys to the connecting pins installed in the blocks. The connecting pins being held in the link plates, the chain transmits the traction forces at the connecting pins 15 to the entire chain through the link plates. The rotational power of the pulleys through traction force on the chain, coupled frictionally to the V-blocks 11 (or 1), transmits the driving force of the pulleys to tension applied to the chain via the connecting pins. The device does not transmit driving force through a relative thrust of the V-blocks, nor is power wasted in needless compression of V-blocks.

Since the present invention has the above-mentioned arrangement and the frictional transmission V-blocks and the chain are connected by the connector pins, the chain is smoothly bent and fed into the V-grooves of the pulleys without being floated therein and without any fluttering when the chain is wound around the pulleys. Furthermore no sliding is produced between the V-blocks and the chain, such that the durability of the V-blocks is very much improved. The chain can be applied as the variably-engaged part in a stepless frictional transmission and in that function it is particularly effective.

When the subject chain is applied to a pulley having a complementary slanting contour in its circumferential groove, a transverse inward force on the chain in the area of the pulley results when tension is applied to the chain. It will be appreciated that the structure of the invention provides both a frictional surface on the outer slanting faces of the V-blocks that will be securely engaged on the pulley surfaces, and also the invention provides a substantial supporting structure in the form of transversely oriented pins, whereby the transverse inward forces are withstood. In connection with a continuously-variable transmission of the type having separate pulley faces that can be moved toward and away from one another, the transverse support together with frictional characteristics help the belt to be radially spaced away from the pulley shaft as the pulley faces are brought together, while still maintaining the transmission of power.

The foregoing benefits are achieved in a chain which has linked plates and connecting pins much the same as a roller chain, preferably having slant faces both transversely of the chain run and longitudinally of the chain run. This structure produces a very smooth and very durable power-transmission element.

The invention having been disclosed, variations will now become apparent to persons skilled in the art. Reference should be made to the appended claims rather than the foregoing discussion of particular embodiments, to determine the true scope of the invention.

What is claimed is:
1. A frictional transmission chain, comprising:
a plurality of chain link plates having holes;
connecting pins disposed in the holes in the chain link plates, the connecting pins connecting successive chain link plates to form a chain, the connecting pins projecting laterally from the chain link plate; and,
frictional transmission block pieces, each having holes into which projecting ends of one of the connecting pins of the chain link plates are inserted, and the block pieces also having through-holes through which each opposite end of a holding pin is passed, the through-holes being above and below the holes carrying the projecting ends of said one of the connecting pins, outer surfaces of said block pieces defining V-shaped frictional transmission slanting surfaces, and the holding pins being inserted and fixed at ends of said holding pins in said through-holes arranged above and below said one connecting pin, the holding pins having transverse shoulders bearing outwardly against the block pieces at the frictional transmission slanting surfaces.

2. A frictional transmission chain as set forth in claim 1 further comprising a bushing between the connecting pin and the chain link plate.

3. A frictional transmission chain as set forth in claim 1, wherein the chain link plates and connecting pins form a roller chain.

4. A frictional transmission chain as set forth in claim 1, further comprising a damper pad disposed between the chain link plates and the V-blocks, whereby noise and vibration are reduced.

5. A frictional transmission chain as set forth in claim 1, wherein the block pieces have V-shaped slanting surfaces on lateral sides of the chain for engaging a transmission pulley and the block pieces have shaped surfaces on longitudinal sides of the block pieces for contacting successive block pieces in the chain, the shaped surfaces on the longitudinal sides having a tapered part to be directed radially inwardly to the pulley and an upright part to be directed radially outwardly from the pulley, the upright part of the shaped surfaces of the successive V-blocks being dimensioned and spaced to bear against one another when the chain link plates are in line, whereby chain fluttering is prevented.

6. A frictional transmission chain, comprising:
a plurality of chain link plates having holes;
connecting pins disposed in the holes in the chain link plates, the connecting pins connecting successive chain link plates to form a chain, the connecting pins projecting laterally from the chain link plates; and,
frictional transmission V-blocks having holes into which the connecting pins project, the V-blocks having V-shaped slanting surfaces on lateral sides of the chain for engaging a transmission pulley and the V-blocks having shaped surfaces on longitudinal sides of the V-blocks for contacting successive V-blocks in the chain, the shaped surfaces on the longitudinal sides having a tapering part to be directed radially inwardly to the pulley and an upright part to be directed radially outwardly from the pulley, upright parts of the shaped surfaces of the successive V-blocks bearing against one another when the chain link plates are in line, whereby chain fluttering is prevented.

7. A frictional transmission chain as set forth in claim 6, wherein the V-blocks each have a first part closing around the chain link plates on the lateral sides and on a radially-inward side of the chain, and the V-blocks also have a lid part closing over a radially-outward side of the chain, the lid member being a separate part fitted and sealed to said first part.

8. A frictional transmission chain as set forth in claim 6, further comprising a damper pad disposed between the chain link plates and the V-blocks, whereby noise and vibration are reduced.

9. A frictional transmission chain as set forth in claim 6 further comprising a bushing between the connecting pin and the chain link plate.

10. A frictional transmission chain as set forth in claim 6, wherein the chain link plates and connecting pins form a roller chain.

* * * * *